Oct. 30, 1956            G. A. LAUVER            2,768,858
AUTOMATIC END GATE LATCH CONTROL FOR DUMP TRUCKS
Filed Jan. 12, 1955            2 Sheets-Sheet 1
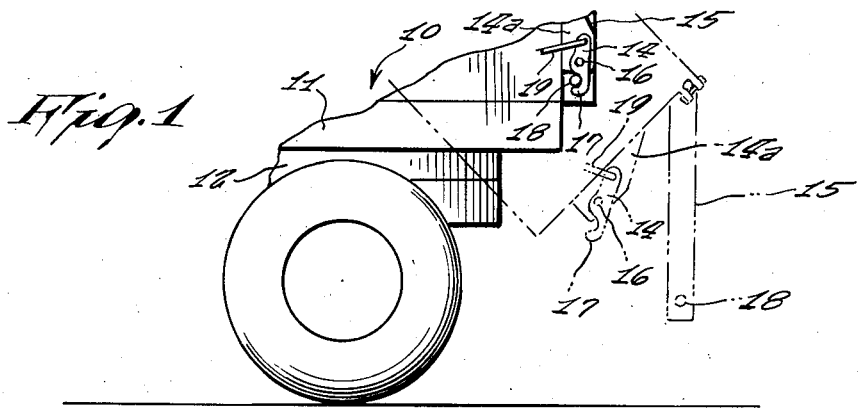
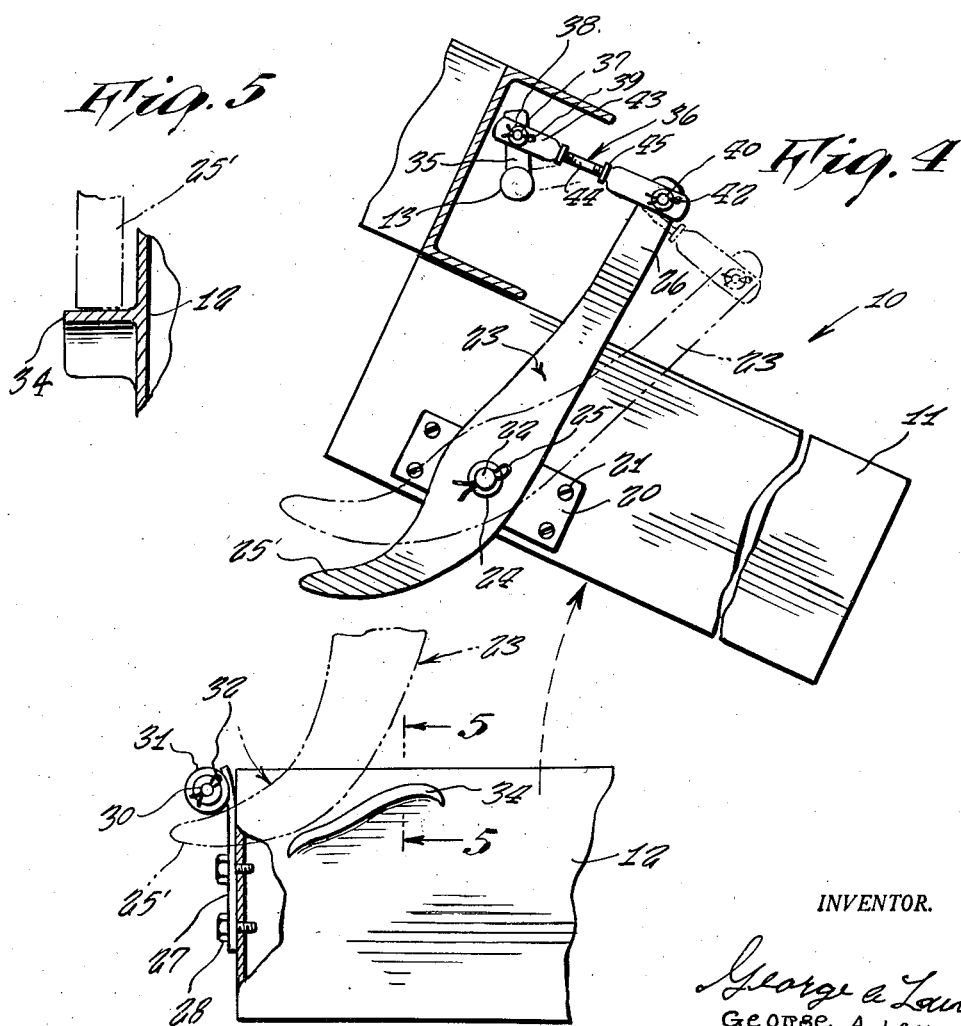
INVENTOR.
George A. Lauver Oct. 30, 1956  G. A. LAUVER  2,768,858
AUTOMATIC END GATE LATCH CONTROL FOR DUMP TRUCKS
Filed Jan. 12, 1955  2 Sheets-Sheet 2
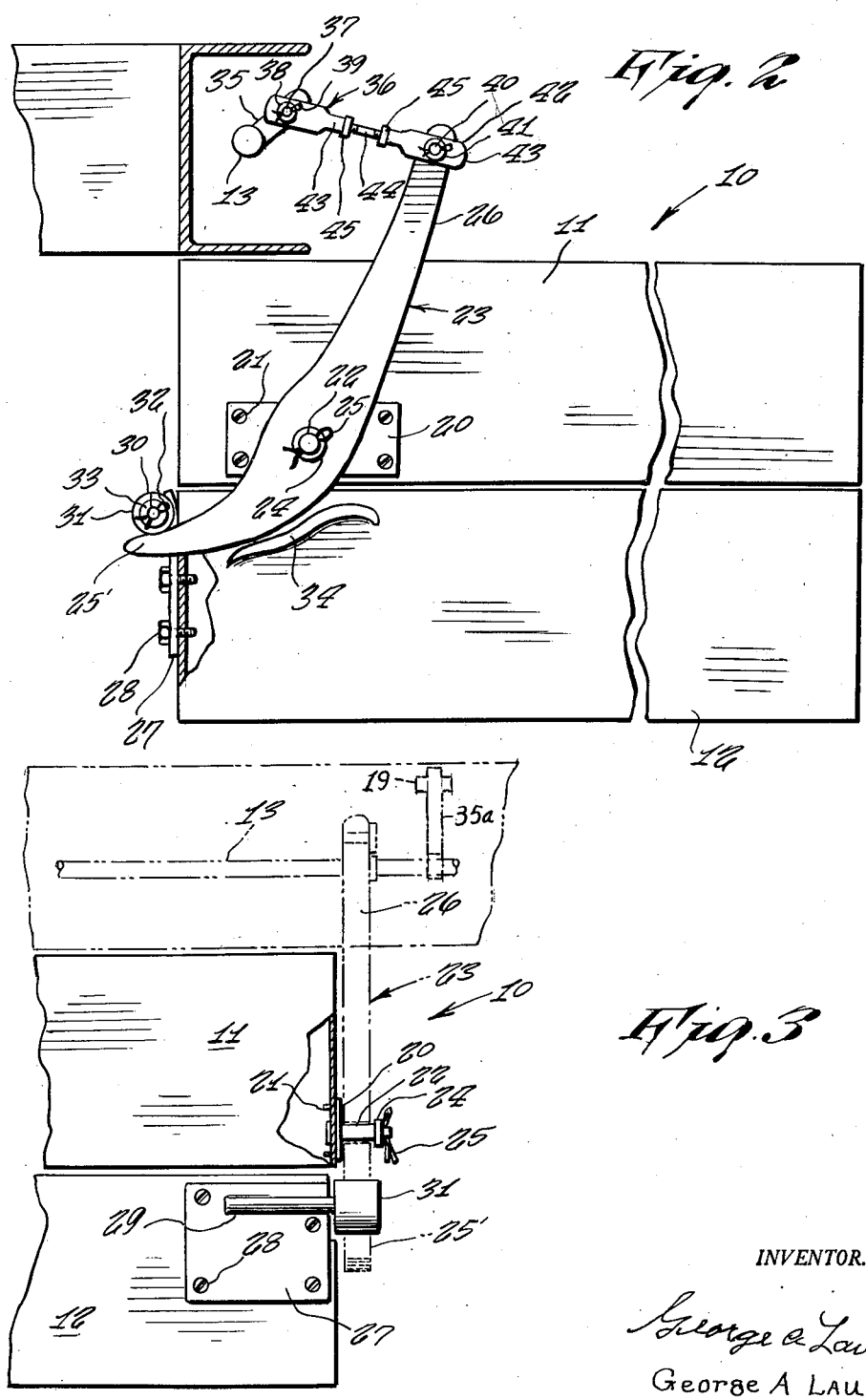
INVENTOR.
George A Lauver

United States Patent Office 2,768,858
Patented Oct. 30, 1956

2,768,858

AUTOMATIC END GATE LATCH CONTROL FOR DUMP TRUCKS

George A. Lauver, Wichita, Kans.

Application January 12, 1955, Serial No. 481,458

5 Claims. (Cl. 298—23)

This invention relates to controls for the end gate latch of dump trucks.

It is an object of the present invention to provide an automatic control for the end gate latch of dump trucks.

It is another object of the present invention to provide an automatic control for end gate latches of dump trucks or the like which may be installed cheaply and quickly without changing any original equipment.

Other objects of the present invention are to provide an automatic control for the end gate latches of dump trucks or the like bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a fragmentary side elevational view of the rear end of a dump truck showing a conventional end gate latch thereon;

Fig. 2 is an enlarged side elevational view, partly in section, of a part of the forward portion of the dump bed and illustrating a preferred embodiment of the invention shown in one position;

Fig. 3 is a fragmentary end elevational view looking from the left of Fig. 2;

Fig. 4 is a view similar to Fig. 2 but showing the dump bed in a raised position and the invention in a different position; and Fig. 5 is a vertical sectional view taken along the line 5—5 of Fig. 4.

Referring now more in detail to the drawing, 10 indicates generally a dump truck or the like of conventional design including the usual upper frame of the dump bed 11 and the lower frame of the dump bed 12, substantially as illustrated. 13 represents a conventional control rod (part of the original equipment of the truck) which is employed to operate the end gate latch, also of any suitable construction. As shown in Fig. 1, this end gate latch construction may include a latch element 14 which is pivotally connected to a bracket 14a by means of a pin 16, the lower end of the latch element 14 terminating in a hooked portion 17 adapted to engage a pin 18 whereby to retain the end gate 15 in a closed position. The bracket 14a is fixed to the rear end of a side wall of the truck body and the pin 18 is fixed to and extends from an end of the tail gate 15. The rotation of the latch element 14 to open the end gate, as shown in phantom in Fig. 1, will be suitably synchronized with the rotation of the operating rod 13, as seen in Figures 2, 3 and 4, for example by suitable linkage 19. The foregoing components are all standard equipment and form no part of the present invention.

In the practice of my invention, automatic control means are provided for positively releasing the end gate latch element 14 when the upper frame of the dump bed 11 is raised, this automatic control being connected to the conventional operating rod 13 as will hereinafter become clear.

A plate 20 is suitably secured to the upper frame of the dump bed 11, near the forward end of said upper frame, for example by means of screws 21, the plate 20 serving to rotatably mount a pin or shaft 22 journalled therein.

An arcuate lever 23 is rotatably mounted on pin 22, being secured thereon by means of a washer 24 and a cotter pin 25. The lever 23 includes a hooked lower end 25' which extends beyond the forward end of the lower frame 12 (Fig. 2) and an upper end 26 which terminates near the control rod 13.

A plate 27 is fixedly mounted on the forward end of the lower frame 12 near the lever 23, being secured thereat by means of screws 28 or the like. The plate 27 mounts a bearing member 29 within which is rotatably mounted a shaft 30 onto which is mounted a roller 31, the roller 31 being secured thereon by means of the cotter pin 32. The roller 31 is adapted to engage the upper longitudinal edge of the hooked portion 25' (Fig. 2) when the lever 23 is in the position of Fig. 2. A washer 33 is provided on shaft 30 intermediate the cotter pin 32 and roller 31. Roller 31 controls the release of the latch element 14, as will hereinafter become clear.

A curved shelf 34 is secured to the side of the lower frame 12 and is disposed to be engaged by the lower longitudinal edge of the hooked portion 25' when said portion is moving downwardly, from its full line position of Figure 4 to its position of Figure 2.

A crank arm 35 is secured to the control rod 13 and pivotally mounted one end of an adjustable link 36 by means of a pin 37, washer 38 and cotter pin 39. The other end of the adjustable link 36 is pivotally connected to the upper end 26 of the lever 23 by means of a pin 40, a washer 41 and a cotter pin 42. The length of the adjustable link 36 may be adjusted by adjusting the end portions 43 along an externally threaded central connecting portion 44, as will be obvious. Lock nuts 45 are provided.

Fig. 2 illustrates the automatic control with the lower hooked end 25' disposed between the roller 31 and shelf 34, the position of the device when the dump bed is down in a horizontal position and the latch element is in its engaged position as seen in full lines in Figure 1. The lever 23 (and therefore the latch element 14) is held in a secure position by means of the weight of the dump bed 11 which forces the lower edge of the hooked portion 25' downwardly against shelf 34, by which the lever end 25' is cammed from the full line to the phantom line position thereof beneath the roller 31, as seen in Figure 4. Also as seen in this view when the upper frame of the dump bed 11 is raised in the direction of the arrow, the upward movement of the hooked portion 25' will cause said portion to strike the underside of roller 31 whereby through a cam action the lever 23 is turned counterclockwise, as seen in Figures 2 and 4, thus causing the upper end 26 to move toward the control rod 13 and rotate the latter counterclockwise through substantially one-half a revolution by means of the link 36. A crank arm 35a projects from the rod 13 in the same direction as the crank arm 35, as seen in Figure 3. The other forward end of the link 19 is pivoted to the crank arm 35a so that when rod 13 is turned counterclockwise (Figures 2 and 4), a forward pull will be exerted on link 19 to swing the latch element 14 to its released phantom line position of Figure 1. When rod 13 is swung in the other direction or clockwise, a rearward thrust is exerted on link 19 to swing latch element 14 clockwise (Figure 1) back to its engaged full line position of Figure 1. Thus as the dump bed is raised, the end gate latch will automatically be released to permit opening of the end gate 15, as shown in phantom in Fig. 1.

While various changes may be made in the detail construction it shall be understood that such changes shall be within the spirit and scope of the present invention as defined by the appended claims.

What I claim as new and desire to protect by Letters Patent of the United States is:

1. In combination with a pivotally mounted latch element for a dump truck tail gate, a rigid link connected to and extending forwardly from the latch element, and a latch actuator carried by the dump bed including a rotatably mounted rod having a crank arm projecting radially therefrom and to which said link is connected; a lever pivotally mounted intermediate of its ends about a horizontal axis on the dump bed for swinging movement therewith and relative thereto, a second crank arm fixed to and extending radially from said rod and disposed substantially in alignment with the first mentioned crank arm, link means connecting the lever above the pivot axis thereof to said second crank arm, said lever having a curved lower end disposed below the lever pivot, a lower cam element supported by the truck frame and disposed to be engaged by the lower end of the lever as the dump bed is swung downwardly for rocking the lever in one direction to turn said rod in a direction to swing the latch element to an engaged position as the dump bed approaches a lowered horizontal position, and an upper cam element supported by the truck frame and disposed in the path of movement of the lower lever end as the dump bed is swung upwardly toward a tilted position to rock the lever in the opposite direction to turn said rod in the other direction for swinging the latch element to a released position.

2. In a latch actuating structure as in claim 1, said cam elements being longitudinally spaced relative to one another and disposed so that a portion of the lower end of the lever is swung by engagement with said lower cam element into a position beneath said upper cam element.

3. In a latch actuator as in claim 2, said upper cam element being disposed relative to said lower cam element whereby when the lever is swung upwardly with the truck bed the lower lever end will be rocked by said upper cam element into a position to engage the lower cam element when the truck bed and lever are again swung downwardly.

4. In a latch actuator as in claim 1, said lower cam element comprising a downwardly and forwardly inclined shelf, said upper cam element comprising a roller.

5. In a latch actuator as in claim 4, said roller being disposed forwardly of and above the level of the forward end of said shelf.

References Cited in the file of this patent

UNITED STATES PATENTS

| | | |
|---|---|---|
| 1,332,424 | Carlson | Mar. 2, 1920 |
| 2,009,466 | Yeager | July 30, 1935 |

FOREIGN PATENTS

| | | |
|---|---|---|
| 476,394 | Canada | Aug. 28, 1951 |
| 570,648 | France | May 5, 1924 |